United States Patent
Mathis

(10) Patent No.: US 6,269,254 B1
(45) Date of Patent: Jul. 31, 2001

(54) RADIO COMMUNICATIONS DEVICE AND METHOD WITH API BETWEEN USER APPLICATION PROGRAM AND TELEPHONY PROGRAM AND METHOD

(75) Inventor: James E. Mathis, Barrington, IL (US)

(73) Assignee: Motorola, Inc., Schaumbrug, IL (US)

( * ) Notice: Subject to any disclaimer, the term of this patent is extended or adjusted under 35 U.S.C. 154(b) by 0 days.

(21) Appl. No.: 09/161,817

(22) Filed: Sep. 28, 1998

(51) Int. Cl.$^7$ ..................................................... H04B 1/38
(52) U.S. Cl. ........................ 455/557; 455/553; 379/93.04
(58) Field of Search .................... 455/556, 557, 455/553, 552, 84, 575; 379/93.04, 93.05, 93.06, 93.24

(56) References Cited

U.S. PATENT DOCUMENTS

| | | | |
|---|---|---|---|
| 5,625,678 | * 4/1997 | Blomfield-Brown | 379/93 |
| 5,652,866 | * 7/1997 | Aldred et al. | 395/500 |
| 5,781,612 | * 7/1998 | Choi et al. | 455/553 |
| 5,852,773 | * 12/1998 | Hu | 455/557 |
| 5,933,778 | * 8/1999 | Buhrmann et al. | 455/461 |
| 5,983,117 | * 11/1999 | Sandler et al. | 455/557 |
| 6,055,424 | * 4/2000 | Tornquist et al. | 455/414 |
| 6,055,441 | * 4/2000 | Wieand et al. | 455/557 |

\* cited by examiner

*Primary Examiner*—William Trost
*Assistant Examiner*—Tilahun Gesesse
(74) *Attorney, Agent, or Firm*—Hugh C. Dunlop; Romi N. Bose; Hisashi D. Watanabe

(57) ABSTRACT

A radio communications device has a memory having stored therein a user application program (16), a telephony program (18) and an application programming interface (API) 30 between these. Various aspects of the API are described. In one aspect, the API has a command for establishing a call and the telephony program accepts, as an argument of the command for establishing the call, an array identifying several terminal objects (54–58), thereby permitting establishment of a call for multiple terminal objects. In another aspect, groupings of events are described and an API command defines an event class from one of the groups together with an ID defining an event within the event class. In a further aspect, a program in the telephony program is called to create a call object (50). The call object is created regardless of whether radio service for the radio comunications device has been established.

12 Claims, 6 Drawing Sheets

RADIO COMMUNICATIONS DEVICE AND METHOD WITH API BETWEEN USER APPLICATION PROGRAM AND TELEPHONY PROGRAM AND METHOD

FIELD OF THE INVENTION

This invention relates to the radio communications device having a user application program (commonly referred to as an application or applet) and a telephony program (e.g. an instance of a telephony class) and an application programming interface (API) between the user application program and the telephony program. The invention relates to aspects of the API and it relates to a method invoked through the API, for example a method for establishing a dual mode call.

BACKGROUND OF THE INVENTION

Object oriented program languages such as Java (TM) are increasingly popular in more and more devices on account of portability of programs across platforms, operating systems and devices. This means that a program developed for one device is more readily used on another device of different characteristics, for example different operating systems or different microprocessors.

This popularity of object oriented programs is extending into devices that are significantly smaller in terms of memory size and processing power than traditional personal computers and other platforms on which such languages have been in widespread use. Problems have emerged in attempting to use object orienting languages such as Java (TM) on very small platforms for a number of reasons. An example of a problem lies in the need to support a complete set of object classes, where an object is a self-contained computer program which interacts with other programs in a defined manner, and where a class is a generic template for a set of objects with similar features. A problem is that in order to maintain the portability of programs across different platforms, uniformity needs to be present in the classes that any given application expects to be able to invoke. For example, pJava (TM) has a very large set of class libraries and efforts are in place to define a smaller language to be termed "eJava" (TM) using only a subset of the complete set of class libraries.

An example of a class is a telephony class that is invoked through a Java (TM) telephony API (JTAPI). An instance of such a class could be termed a "JTAPI implementation".

JTAPI is a portable, object oriented application programming interface for JAVA (TM)-based computer-telephony applications described at the following universal resource locator on the worldwide web: www.javasoft.com/products/JTAPI/index.html. The JAVA (TM) Telephony API supports both first- and third-party telephony application domains. The API is designed to make programming simple applications easy, while providing those features necessary for advanced telephony applications. JTAPI is a set of APIs. There is a "core" API providing a basic call model and rudimentary telephony features, such as placing telephone calls and answering telephone calls. The core API is surrounded by standard extension APIs providing functionality for specific telephony domains such as call centers and media stream access. Applications written using JTAPI are portable across various computer platforms and telephone systems. Version 1.2 of JTAPI was released to the public in December 1997.

An example of use of JTAPI is in a network configuration where the JTAPI application or JAVA (TM) applet runs on a remote station, such as a network computer with only a display, keyboard, processor and some memory. This computer accesses network resources, making use of a centralized server that manages telephony resources. JTAPI communicates with this server via a remote communication mechanism, such as the remote method invocation (RMI) of Java (TM) or a telephony protocol. The JAVA (TM) telephony API is composed of a set of JAVA (TM) language packages. Each package provides a piece of functionality for a certain aspect of computer-telephony applications.

Implementations of telephony servers choose the packages they support, depending on the capabilities of there underlying platform hardware. Applications may query for the packages supported by the implementation they are currently using. Additionally, application developers may concern themselves with only the supported packages that applications need to accomplish a task. For example, a call package permits applet designers to add telephone capabilities to a web page, while a number of standard extension packages extend the JTAPI core package. These extension packages bring additional telephony functionality to the API, such as: all control, call center, media, phone, private data and capabilities packages.

It would be desirable to use a standard telephony API such as JTAPI as a telephony API for a radio telephone or other radio communication device.

A number of problems lie in the way of using JTAPI as a telephony API for a wireless communication device, and in particular as a telephony API for a Global System for Mobile (GSM) radio telephone. In general JTAPI still suffers from the burden of having over 63 event classes with a total class file size of approximately 130 k bytes. This represents a substantial memory allocation for a relatively minor element of an overall program for a radio telephone. There is a need to reduce the memory requirement for programs that are JTAPI compatible.

In the context of a GSM communication device, there are GSM functions that cannot be easily accessed using existing JTAPI syntax and method signatures. Moreover, there is a need to support a dual-mode call (which is a term used in GSM for a voice and fax call or a voice and data call) and the concept of a dual-mode call is unknown in wireline telephony and in JTAPI. Simply adding to JTAPI or reducing JTAPI do not provide satisfactory solutions, because adding to JTAPI increases the need for finding event classes, and reducing JTAPI eliminates the benefit of a standard API that permits portability of applications across platforms.

Accordingly, there is a need for a telephony API for a radio communications device and associated classes that occupy a minimum of memory and support features that are unique to radio telephony.

DETAILED DESCRIPTION OF THE DRAWINGS

Figure 1:
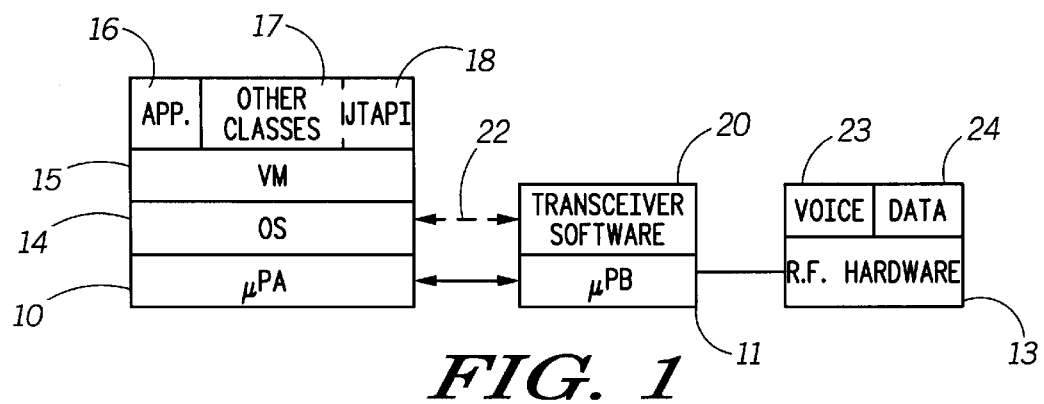
FIG. 1 shows an example of a radio telephone device in accordence with a first embodiment of the invention.

Referring to FIG. 1, a radio telephone is illustrated in terms of different layers, with hardware at the lowest layer and applications software at the highest layer. The radio telephone comprises a first microprocessor 10 (microprocessor A), a second microprocessor 11 (microprocessor B) and certain RF hardware 13. The microprocessors A and B are connected together. The microprocessor B is connected to the RF hardware 13. The RF hardware 13 includes at least a receiver and a transmitter. The RF hardware also has voice communication elements 23 which preferably include a voice coder, by way of example, and data communication elements 24 which preferably include a data modem or fax modem, by way of example. The microprocessor has an operating system (OS) 14 such as OS 9000 supplied by Microware Systems Corporation of Des Moines, Iowa. Above the operating system is shown a virtual machine 15, such as a commercially available JAVA (TM) virtual machine. An application program 16 and various other JAVA (TM) classes 17 run on the virtual machine 15. One of the classes 17 is a JTAPI implementation 18. The microprocessor 11 has transceiver software 20 which performs such functions as call control, framing and generally byte level manipulation such as block coding. The transceiver software 20 communicates across a common service provider module interface (CSPMI) 22 with the operating system 14.

Figure 2:
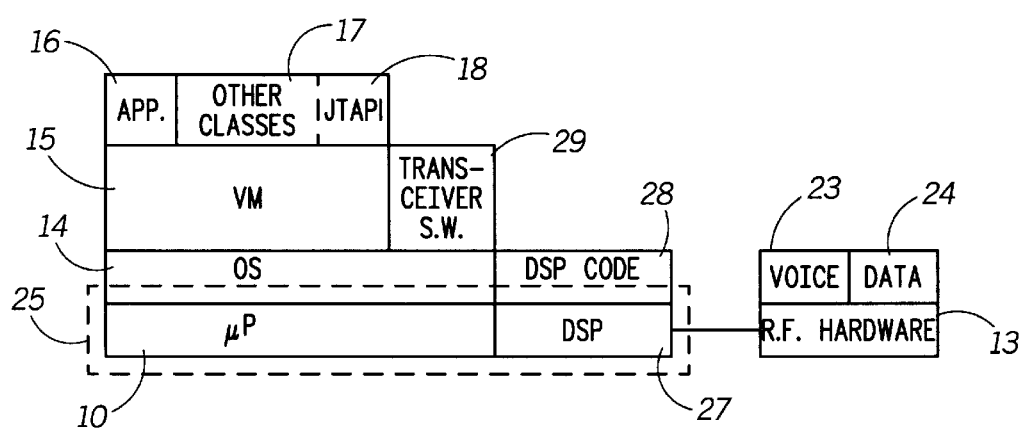
FIG. 2 shows an example of a radio telephone device in accordance with a second embodiment of the invention.

As an alternative to the arrangement of FIG. 1, the microprocessors A and B can in effect be integrated into a single integrated circuit 25 as shown in phantom outline in FIG. 2. In this embodiment, the microprocessor 10, the hardware 13, the operating system 14, the virtual machine 15 and the various software elements 16–18 are the same as in the embodiment of FIG. 1. In place of the microprocessor B, there is a digital signal processor (DSP) integrated with the microprocessor 10 in the single integrated circuit 25. The DSP 27 has DSP code 28 which performs framing and other byte-level manipulations such as block coding, while other transceiver software functions such as call control are performed by transceiver software code 29 which is run on the microprocessor 10 using the operating system 14. A suitable integrated circuit 25 is the M-core (TM) integrated microprocessor and DSP available from Motorola, Inc., of Schaumburg, Ill.

Figure 3:
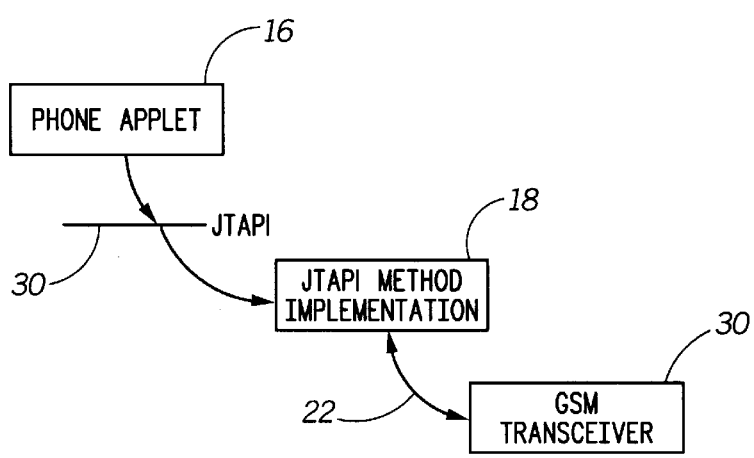
FIG. 3 is a software architecture diagram illustrating the structure of software or either of the radio telephones of FIG. 1 and FIG. 2.

In FIG. 3, the application 16 is shown (refered to as a "phone applet") and the JTAPI method implementation 18 is shown. A JTAPI interface 30 is shown interfacing between the phone applet 16 and the JTAPI method implementation 18. The JTAPI method implementation 18 controls and receives input from a radio transceiver such as a GSM transceiver 30 over the CSPMI 22. The GSM transceiver 30 comprises the second microprocessor 11, the RF hardware 13 and the transceiver software 20 (all shown in FIG. 1).

The JTAPI 30 is substantially as described in the JTAPI specification version 1.2, which defines the syntax or operation of high level objects, such as "Provider" and is set out in Appendix A. In addition, certain operations specific to GSM are supported, for which the following specific semantics are now defined.

The domain of the JTAPI Provider is simply the mobile station (MS). The only addresses in the Provider's domain are those of the MS, e.g., a single address in the domain for a single line phone.

Provider.getAddresses( ) returns an array of addresses for the MS, typically with only 1 entry. If the MS supports multiple lines and telephone numbers, the default or primary address is the first entry.

Provider.getAddress( ) accepts only the number or numbers assigned to the MS. By default, the primary address, i.e., getAddresses( )[0], is returned.

Provider.getTerminals( ) returns an array of Terminals supported by the MS. A separate terminal is defined for each call bearer type (see below).

Provider.getTerminals( ) takes a string specifying the name of the terminal. By default, the voice Terminal is returned. All implementations must support VOICE, DATA and FAX as names for the respective Terminals (see below).

Provider.createCall( ) will create a call even if the Provider is OUT_OF_SERVICE, as long as it has not been shut down. The call cannot be successfully placed until the Provider is IN_SERVICE. This feature is a change to JTAPI 1.2 createCall( ) pre-conditions and is described below in greater detail with reference to FIGS. 5 and 6.

Call.connect( ) parses the destination address string for common SS codes and address flags. If the destination number string passed to Call.connect( ) starts with a "+" character, the type-of-number (TON) is set to INTERNATIONAL; otherwise, the TON is UNKNOWN. If the string contains only numeric digits, the numbering-plan identifier (NPI) is ISDN, otherwise it is UNKNOWN.

TerminalConnection.join( ) and TerminalConnection.leave( ) are used to change call modes in a dual-mode (voice and data or voice and fax) call. There is always exactly one TerminalConnection that is active in a call; invoking join( ) on another TerminalConnection causes a switch in call mode and calling leave( ) on the active TerminalConnection automatically activates the alternate one.

Applications can interact with the information content of the call using the API defined for MediaTerminalConnection. If a TerminalConnection returned from Connection.getTerminalConnections( ) implements MediaTerminalConnection, the application can use the following methods: MediaTerminalConnection.getMediaAvailability( ), which is implemented as defined in JTAPI 1.2; MediaTerminalConnection.getMediaState( ), which is implemented as defined in JTAPI 1.2; MediaTerminalConnection.generateDtmf( ), which is used to generate DTMF tones on the call. All other methods in MediaTerminalConnection are optional.

The Provider will not necessarily disconnect any active calls when it goes out of service. The Provider may keep the Call active and attempt to reestablish the call, assuming a temporary communication failure. The application can assume that the Provider is attempting to reestablish a call if the ProvOutOfServiceEv is not closely followed by CallInvalidEv and related ConnDisconnectedEv events (i.e. if these latter do not follow within a timeout time).

Furthermore, some GSM functions cannot be easily accessed using the existing JTAPI syntax and method signature. The following new methods or methods with different signatures are defined.

Provider.getNetworkID( ) returns the name of the current network.

Provider.getServiceLevel( ) returns the operating service level, NONE, EMERGENCY, FULL.

Provider.isRoaming( ) returns true if the MS is not on the home PLMN.

These new methods allow the application to determine the current public land mobile network (PLMN), operating service level and whether or not the unit is on the home PLMN.

In JTAPI, the Terminal object represents the physical end-point of the call. It is assumed that the call is carrying voice. To support the additional call bearer types defined for GSM, additional Terminal subclasses are defined, one for each major call bearer type. The DataTerminal subclass of Terminal represents the physical end-point of a GSM data call. The FaxTerminal subclass of Terminal represents the physical end-point of a GSM fax call.

A typical GSM MS will support at least three Terminals, a VOICE, a DATA and a FAX Terminal. An MS may support additional Terminal instances or subclasses (e.g., a Internal-DataTerminal for internal data and a ModemDataTerminal for data sent to a connected PC). Applications accept incoming calls of various bearer types by observing incoming call events on the appropriate Terminal.

Figure 4:
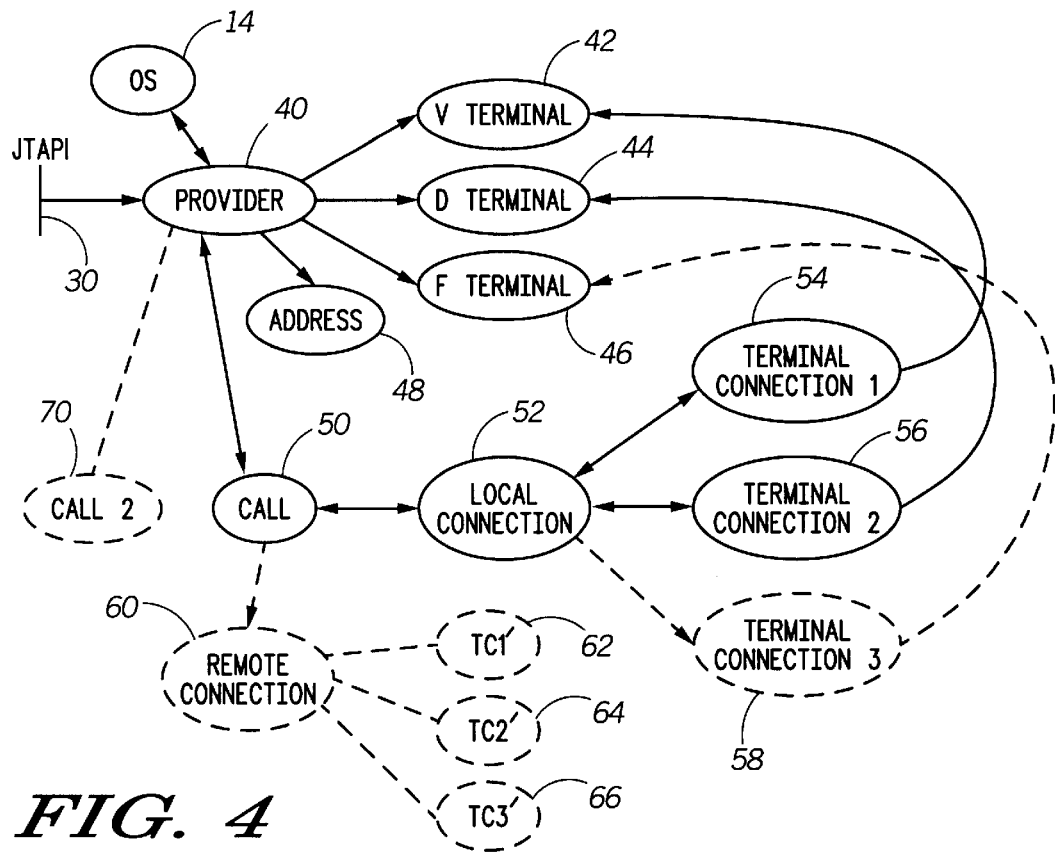
FIG. 4 is a program flow diagram illustrating further details of the JTAPI method implementation of FIG. 3.

There is now described, with reference to FIG. 4, a particular feature that permits supporting of a dual mode GSM call.

FIG. 4 illustrates details of the JTAPI implementation 18 of FIG. 3. Central to the method is the provider method 40. This provider method interfaces with the operating system 14 in a manner that need not be described in detail. As used in this context, a "method" is a function defined inside a class that operates on instances of that class. The provider method 40 has associated with it a voice terminal object 42, a data terminal object 44, a fax terminal object 46, and an address object 48. When a call is to be set up, the provider method 40 creates a call object 50. The call object 50 creates a local connection object 52. For a simple voice connection, the local connection object 52 creates a terminal connection object 54 which references the voice terminal 42. As will be described in greater detail, the local connection object 52 can also create a second terminal connection object 56 (and even a third terminal connection object 58). The second terminal connection object 56 references the data terminal object 44. The third terminal object 58, if present, can reference the fax terminal 46. As an alternative configuration, the second and third terminal connection objects can be generated for the purpose of creating a data and fax call, as will be described in greater detail.

It may be noted that if the call is a three-way call, the call object 50 will create an additional remote connection object 60 with its own associated terminal connection objects 62–66, as necessary. It may also be noted that if there is another call (for example a call on hold) the provider method 40 can create an additional second call object 70 which will have its own corresponding local connection and terminal connections. In all cases, for a given radio telephone, there are only three terminals: the voice terminal, the data terminal and the fax terminal. So in all cases, the various terminal connection objects created by the local connection 52 and the remote connection 60 and any other local connections or remote connections all reference the respective voice terminal object 42, data terminal object 44 and fax terminal object 46.

In the process about to be described, it is the aim that the GSM transceiver 30 sets up a call with a remote switch over a radio telephone communications channel and in the case where the call is a dual mode (e.g. voice and data or voice and fax) it is the aim for the JTAPI method implementation 18 to set up a call with dual mode capability and to inform the GSM transceiver over the CSPMI 22 that a dual mode call has been established, so that the GSM transceiver 30 can inform the GSM system that the call is a dual mode call, so that in turn the switch of the GSM system, upon receipt of the request to set up a call makes a call and reserves a modem of its interworking function to support the data or fax functionality of the call. It is further the aim to establish this dual mode call at the instigation of the phone application 16, using the JTAPI command call.connect( ).

In JTAPI version 1.2, call.connect( ) expects an argument that is a terminal object, thereby permitting establishment of a single mode call to or from that terminal. In order to establish a dual mode call, the preferred embodiment of the present invention permits call.connect( ) to be overridden to add a method that takes as a first argument a terminal array, instead of a single originating terminal. The terminal array is the argument of the command call.connect and contains an array of terminal objects which may be a voice terminal and a data terminal or a voice terminal and a fax terminal or a data terminal and a fax terminal or a voice terminal, a data terminal and a fax terminal. When the method provider 40 is invoked with this command and an array as an argument, it creates the call object 50 and the local connection object 22. The local connection object 22 creates the first and second terminal objects 54 and 56. The local connection object 52 queries the first terminal connection object 54 for its terminal and the first terminal object 54 replies to the local connection object 52 indicating that its terminal (i.e. the terminal that its references) is the voice terminal. Similarly, the second terminal connection object 56 is queried by the local connection object 52 and replies by indicating that its terminal is the data terminal. The local connection object 54 informs the call object 50 that a data terminal connection and a voice terminal connection are established. The call object 50 informs the provider 40 that the dual mode call has been established. The provider 40 informs the GSM transceiver over the CSPMI 22 (through the OS 14) that the dual mode call has been established.

The provider 40 establishes the call through the transceiver 30 as follows. The provider 40 creates a buffer that has as its type PlaceCallReq and it adds parameters M/O/C from the following Table 1. These parameters describe the call.

TABLE 1

| Parameter Name | Parameter Type | M/O/C |
| --- | --- | --- |
| CallType | CALL_TYPE | M |
| CalledParty[1] | PHONE_NUMBER | C |
| RepeatIndicator[2] | REPEAT_INDICATOR | O |
| CallType[2] | CALL_TYPE | O |
| DataParameters[3] | DATA-PARAMETERS | C |
| CLIRDisposition[4] | CLIR_DISPOSITION | O |
| CUGInfo[5] | CUG_INFO | O |

[1]Optional for Emergency calls, Mandatory for all other call types.
[2]Mandatory for Multiple Call Type Calls.
[3]Mandatory when any Call Type is for Fax or Data.
[4]May be included if client wishes to override CLIR subscription default.
[5]May be included if client wishes to override CUG subscription defaults.

The contents of this buffer are sent across the serial link 22 to the transceiver 30 and, if accepted, the transceiver returns the confirmation message from the following table 2.

TABLE 2

| Parameter Name | Parameter Type | M/O/C |
| --- | --- | --- |
| CallHandle[1] | CALL_HANDLE | C |

[1]Mandatory of the call request is successful.

This confirmation message gives call-handle which allows the microprocessor 10 to identify the call in subsequent commands.

In Table 1, call type 2 indicates an alternate call type and indicates that the alternate call type is data or fax (the initial call type is always voice in GSM). In this manner, the provider 40 informs the transceiver 30 that there is an alternate call type and that it is data (alternatively fax). Thus, when the transceiver 30 sets up the call, the switch is then informed that there an alternate call type and that this alternate call type requires reservation of a data modem (or a fax modem).

The first terminal array entry is the initially active terminal, but the call is configured to handle any of the terminals declared in the array, that is, the terminal connections to the other terminals are placed in the call control terminal connection.bridgedstate (or terminalconnection.passivestate). As discussed above, joined/leave is used to control the current mode of the call. This variant of connect ( ) is used to support the GSM requirement of initially declaring dual-mode call parameters (thus requiring the application 16 to declare up front all of the terminals that might participate in the call).

Call.connect( ) is overridden to add methods to explicitly specify the TON (type of number) and NPI (numbering plan identifier) of the destination address string, if these cannot be inferred as described above.

Call.setEmergency( ) is defined to set the emergency mode flag.

Call.setCUGInfo( ) is defined to specify closed user group information in a programmatic form rather than using SS (supplementary services) codes in the destination address string.

Call.setCallerIdRestricted( ) is defined to specify calling line identification restriction requests in a programmatic form rather than using SS codes in the destination address string.

Call.offHook( ) is not supported.

Applications cannot specify the transfer or conference controller. The setTransferController( ) and setConferenceController( ) methods throw MethodNotSupported and getConferenceController( ) and getTransferController( ) return <NULL>

The setConferenceEnable( ), getConferenceEnable( ), setTransferEnable( ) and getTransferEnable( ) manipulate internal flags that control the ability to transfer or conference this call.

Call.consult( ) invocations must include the destination address string; the unspecified variant is not supported.

Connection.reject(int) is defined to allow the application to specify a reject reason when refusing a call. This supports user-determined-user-busy functionality.

Connection.addToAddress( ) is not supported.

Connection.park( ) is not supported.

A subclass of terminal connection is defined (data terminal connection) representing the physical link between the network and the end-point data terminal. Methods are defined to specify and query the data call parameters, such as data rate, modem type, layer to protocol etc. Similarly, a sub-class of terminal connection ((fax terminal connection), which is more accurately described as a sub-class of media terminal connection) represents the physical link between the network and the end-point terminals. Methods are defined to specify and query the fax call parameters, such as data weight, group mode etc.

FaxTerminalConnection also provided media-specific methods for configuring the fax media stream, and transmitting data pages and end-of-page indicators.

A new Terminal event is defined to allow applications to determine if call forwarding is active for a "TermForwardingActiveEv" specific Terminal. Forwarding for different services (i.e., voice, fax and data) are signaling through the appropriate Terminal object (i.e., VOICE, DATA, FAX).

It has been mentioned that Provider.createCall( ) will create a call even if the Provider is OUT_OF_SERVICE, as long as it has not been shut down and that the call cannot be successfully placed until the Provider is IN_SERVICE. This feature is described now in greater detail with reference to FIGS. 5 and 6.

Figure 5:
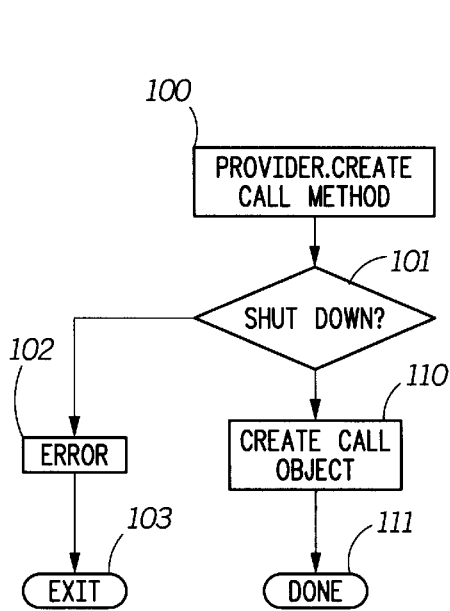
FIGS. 5 and 6 are flow diagrams illustrating details of the JTAPI method implementation of FIG. 3.
Figure 6:
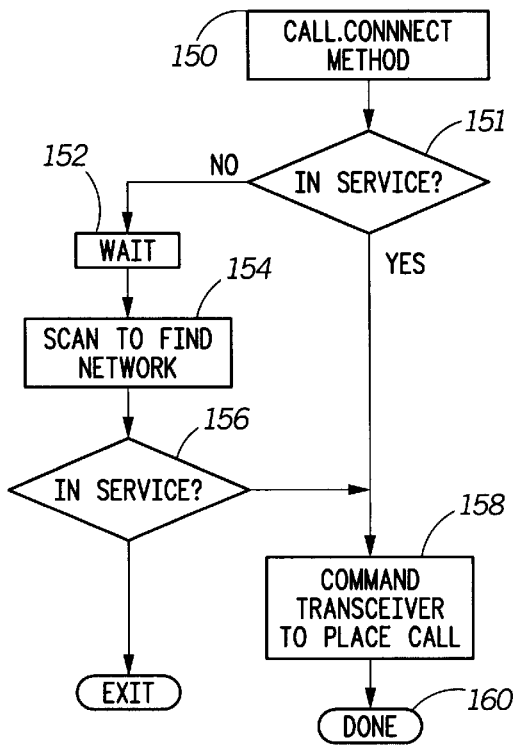

Referring to FIG. 5, the case will be considered where, for whatever reason, the application 16 seeks to place a call or establish a connection or a packet data session. The application 16 is typically the interface to the user and may seek to initiate a call by, for example, the user powering up the radio communications device (the mobile station or MS) and dialing a telephone number. The application 16 initiates the program (or method) illustrated in FIG. 5 by calling (invoking) a Provider.createCall method (step 100) through a Provider.createCall( ) command across the API 30. If, in step 101, the communications device is in a shut down mode, the program simply returns an error in step 102 and exits at step 103. If the device is not in the shut down mode, a Call object 50 is created in step 110, and the program of FIG. 5 is completed at step 111, ready for the program of FIG. 6 to begin.

Immediately following creation of the Call object 50 and without any further events or conditions (and in the absence of any overriding event), the application 16 calls (invokes) a Call.connect method (step 150) through a Call.connect( ) command across the API 30. If, in step 151, the communications device is determined to be out of service, the program (or method) waits in step 152 while other functions perform a scanning operation in step 154. A waiting period of about 10 seconds is typically sufficient to permit connection to a cellular network in a scanning routine. If, following step 151 or step 156, the communications device has established service with a radio communications network, step 158 begins and a command is sent to the transceiver 30 across the serial interface 22 to place the call. The program of FIG. 6 ends at step 160.

In this manner, a user is able to begin dialing a telephone number to place a call even before service has been established. This is a particularly useful feature since a typical user wishes to begin placing a call as soon as the communications device is powered up, without regard for whether service has been established. The establishment of service can begin in response to the act of powering up the device (e.g. upon pressing a power key or opening a flip) and the methods of FIGS. 5 and 6 can begin in parallel, in response to some other act of the user or the application.

It is a significant problem that the JTAPI definition has a separate class for each different JTAPI event. This burdens with the MS with defining over 63 events classes, with a total class file of approximately 130 k bytes.

In accordance an aspect of the present invention, applications are dispatched based on an event ID rather than the type of event class. This replaces the multitude of event classes with a much smaller set of an event-catagory classes. Applications use the event ID to determine a specific event within a broad type. This results in a saving of significant space with no significant loss of object encapsulation.

The event classes are grouped into eight generic classes as follows:

EV—base class of all events.
ProvEv—provider events.
CallCtlAddrEv—address and call control address events.
CallCtlCallEv—call and call control call events.
CallCtlConnEv—connection and call control connection events.
CallCtrlTermEv—terminal and call control terminal events.
CallCtlTermConnEv—terminal connection and call control terminal connection events.
MediaEv—media events.

The specific events grouped into these generic classes are set out in the following table 3.

TABLE 3

| Ev -- base call of all events | ProvEv -- provider events, |
|---|---|
| | ProvInServiceEv |
| | ProvObservationEndedEv |
| | ProvOutOfServiceEv |
| | ProvShutdownEv |
| CallCtlAddrEv -- address and call control address events | CallCtlCallEv -- call and call control call events |
| AddrEv | CallEv |
| CallCtlEv | CallCtlEv |
| AddrObservationEndedEv | CallActiveEv |
| CallCtlAddrDoNotDisturbEv | CallInvalidEv |
| CallCtlAddrForwardEv | CallObservationEndedEv |
| CallCtlAddrMessageWaitingEv | |
| CallCtlConnEv | CallCtlTermConnEv |
| ConnEv | TermConnEv |
| CallCtlEv | CallCtlEv |
| ConnAlertingEv | TermConnActiveEv |
| ConnConnectedEv | TermConnCreatedEv |
| ConnCreatedEv | TermConnDroppedEv |
| ConnDisconnectedEv | TermConnPassiveEv |
| ConnFailedEv | TermConnRingingEv |
| ConnInProgressEv | TermConnUnknownEv |
| ConnUnknownEv | CallCtlTermConnBridgedEv |
| CallCtlConnAlertingEv | CallCtlTermConnDroppedEv |
| CallCtlConnDialingEv | CallCtlTermConnHeldEv |
| CallCtlConnDisconnectedEv | CallCtlTermConnInUseEv |
| CallCtlConnEstablishedEv | CallCtlTermConnRingingEv |
| CallCtlConnFailedEv | CallCtlTermConnTalkingEv |
| CallCtlConnInitiatedEv | CallCtlTermConnUnknownEv |
| CallCtlConnNetworkAlertingEv | |
| CallCtlConnNetworkReachedEv | |
| CallCtlConnOfferedEv | |
| CallCtlConnQueuedEv | |
| CallCtlConnUnknownEv | |
| CallCtlTermEv | MediaEv |
| TermEv | MediaTermConnAvailableEv |
| CallCtlEv | MediaTermConnDtmfEv |
| TermObservationEndedEv | MediaTermConnEv |
| CallCtlTermDoNotDisturbEv | MediaTermConnStateEv |
| | MediaTermConnUnavailableEv |

In summary, a telephony API for a wireless communications device and an associated implementation including a provider method, have been described which are highly suited to development of object oriented computer programs for invoking wireless telephony functions. Using an API that permits a high degree portability across platforms and in an implementation that has a very low memory requirement. Moreover, dual mode call functionality, such as is required in the GSM radio telephone system, is supported using a standard JTAPI event class heretofore used for establishment of simple wireline telephony calls.

In accordance with an aspect of the invention, a radio communications device has been described comprising a memory having stored therein a user application program and a mobile telephony program. The mobile telephony program maintains parameters describing a wireless network to which the device is connected. These parameters include one or more of: a name of a current network; an operating service level of the current network; and an indication of whether the current network is a home network. These parameters may be delivered to the mobile telephony program from a transceiver or over a mobile internet protocol connection. An application programming interface between the user application program and the mobile telephony program has at least one command (e.g. Provider.getNetworkID( ); Provider.getServiceLevel( ); or Provider.isRoaming( ) for calling these parameters and returning them to the application program.

The above description has been given by way of example only and modifications of detail can be made within the scope and spirit of the invention.

APPENDIX 1

The Java Telephony API

An Overview

Version 1.2

Introduction

The Java Telephony API (JTAPI) is a portable, object-oriented application programming interface for Java-based computer-telephony applications. JTAPI serves a broad audience, from call center application developers to web page designers. JTAPI supports both first-and third-party telephony application domains. The API is designed to make programming simple applications easy, while providing those features necessary for advanced telephony applications.

The Java Telephony API is, in fact, a set of API's. The "core" API provides the basic call model and rudimentary telephony features, such as placing telephone calls and answering telephone calls. The core API is surrounded by standard extension APIs providing functionality for specific telephony domains, such as call centers and media stream access. The JTAPI core and extension package architectures are described later in this document.

Applications written using the Java Telephony API are portable across the various computer platforms and telephone systems. Implementations of JTAPI will be available for existing computer-telephony integration platforms such as Sun Microsystem's SunXTL, Microsoft and Intel's TAPI, Novell and Lucent's TSAPI, and IBM's CallPath. Additionally, independent hardware vendors may choose to provide implementations of the Java Telephony API on top of their own proprietary hardware.

Overview Document Organization

This document is organized into the following sections:
Java Telephony API Features—Describes the features of JTAPI and the principles on which it was designed.
Supported Configurations—Summarizes the environments in which JTAPI may be used and the computer and software configurations for which it was designed.
Java Telephony Package Architecture—Summarizes how the Java Telephony API is organized into various Java language packages. A brief description accompanies each package along with links to more detailed documentation.
The Java Telephony Call Model—Describes how telephone calls and different objects that make up telephone calls are represented in this API.
Core Package Methods—Provides a brief summary of the key methods available in the core package which perform the most basic telephony operations, such as placing a telephone call, answering a telephone call, and disconnecting a connection to a telephone call.

Connection Object States—Describes the states in which the Connection object can exist. It provides a description of the allowable transitions from each state.

TerminalConnection Object States—Describes the states in which the TerminalConnection object can exist. It provides a description of the allowable transitions from each state.

Placing a Telephone Call—One of the most common features used in any telephony API is placing a telephone call. This section describes the JTAPI method invocations required to place a telephone call, and examines state changes in the call model. This analysis will explain how calls are placed, answered, and terminated.

The Java Telephony Observer Model—Describes the JTAPI observer model. Applications use observers for asynchronous notification of changes in the state of the JTAPI call model.

Application code examples are not included here, but two real-life code examples using the Java Telephony API can be found in the Java Telephony API Version 1.2 Overview published by Sun Microsystems, Inc. of Palo Alto, Calif. One example places a telephone call to a specified telephone number. The other example shows a designated Terminal answering an incoming telephone call.

Locating and Obtaining Providers—Describes the manner in which applications create and obtain JTAPI Provider objects.

Security—Summarizes the JTAPI security strategy.

Java Telephony Features

The features and guiding design principles for the Java Telephony API are:

Brings simplicity to the most basic telephony applications

Figure 7:
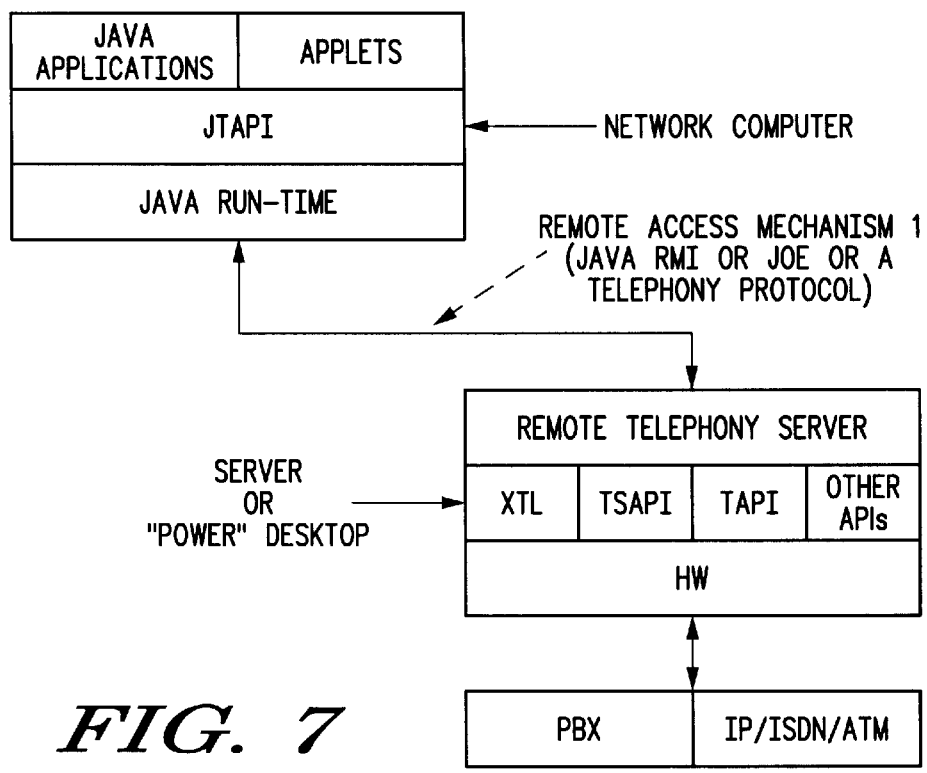
FIGS. 7–13 are referred to in Appendix 1 which describes JTAPI.
Figure 8:
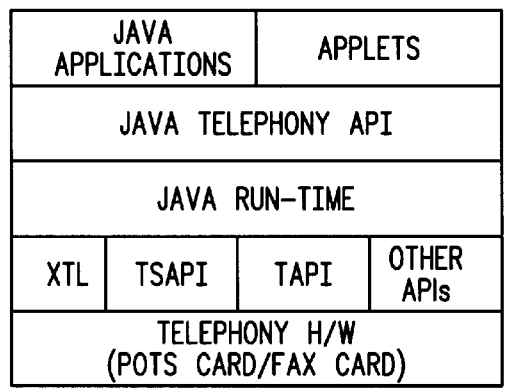

Provides a scalable framework that spans desktop applications to distributed call center telephony applications Interfaces applications directly to service providers or acts as a Java interface to existing telephony APIs, such as SunXTL, TSAPI, and TAPI Based on a simple core that is augmented with standard extension packages Runs on a wide range of hardware configurations, wherever Java runtime can be used Supported Configurations JTAPI runs on a variety of system configurations, including centralized servers with direct access to telephony resources, and remote network computers with access to telephony resources over a network. In the first configuration, a network computer is running the JTAPI application and is accessing telephony resources over a network, as illustrated in FIG. 7. In the second configuration, the application is running on a computer with its own telephony resources, as illustrated in FIG. 8.

Network Computer (NC) Configuration

In a network configuration, the JTAPI application or Java applet runs on a remote workstation. This workstation can be a network computer with only a display, keyboard, processor, and some memory. It accesses network resources, making use of a centralized server that manages telephony resources. JTAPI communicates with this server via a remote communication mechanism, such as Java's Remote Method Invocation (RMI), JOE, or a telephony protocol. The following diagram shows this configuration.

Desktop Computer Configuration

In a desktop configuration, the JTAPI application or Java applet runs on the same workstation that houses the telephony resources. FIG. 8 shows the desktop configuration.

Java Telephony Package Architecture

Figure 9:
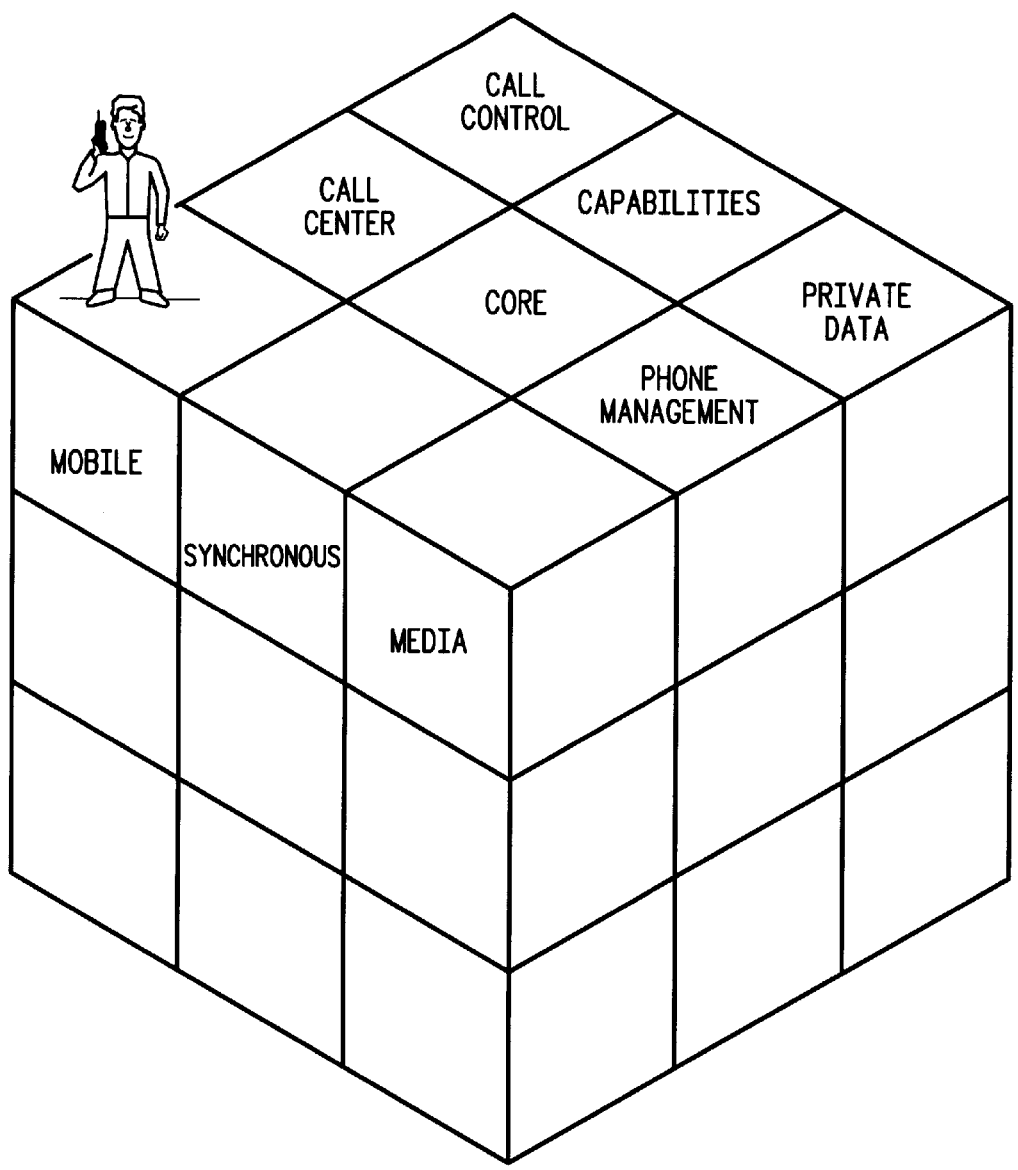

The Java Telephony API is composed of a set of Java language packages. Each package provides a specific piece of functionality for a certain aspect of computer-telephony applications. Implementations of telephony servers choose the packages they support, depending upon the capabilities of their underlying platform and hardware. Applications may query for the packages supported by the implementation they are currently using. Additionally, application developers may concern themselves with only the supported packages applications need to accomplish a task. FIG. 9 depicts the architecture of the JTAPI packages.

At the center of the Java Telephony API is the "core" package. The core package provides the basic framework to model telephone calls and rudimentary telephony features. These features include placing a telephone call, answering a telephone call, and disconnecting a connection to a telephone call. Simple telephony applications will only need to use the core to accomplish their tasks, and do not need to concern themselves with the details of other packages. For example, the core package permits applet designers to add telephone capabilities to a Web page with ease.

A number of "standard extension" packages extend the JTAPI core package. These extension packages each bring additional telephony functionality to the API. Currently, the following extension packages exist for this API: call control, call center, media, phone, private data, and capabilities packages. Each package is summarized below in terms of the features it brings to JTAPI, and is linked to a separate overview document and specifications.

The JTAPI package architecture is a two-way street for both implementations and applications. In other words, telephony server implementations choose which extension packages (in addition to the core package) they implement, based upon the capabilities of the underlying hardware. Applications choose the extension packages (in addition to the core package) they need to use to accomplish the desired tasks of the application. Applications may query the implementation for the extension packages the implementation supports, and the application developer does not need to concern himself/herself with the details of any packages not needed for the application.

Java Telephony Standard Extension Packages

Each JTAPI extension package has its own specification describing its extensions to the core API, and in most cases has its own separate overview document describing it. The chart below lists each extension package available, with a link to the individual overview document, if it exists.

Call Control Package

The javax.telephony.callcontrol package extends the core package by providing more advanced call-control features such as placing calls on hold, transferring telephone calls, and conferencing telephone calls. This package also provides a more detailed state model of telephone calls.

Call Center Package

The javax.telephony.callcenter package provides applications the ability to perform advanced features necessary for managing large call centers. Examples of these advanced features include: Routing, Automated Call Distribution (ACD), Predictive Calling, and associating application data with telephony objects.

Media Package

The javax.telephony.media Package provides applications access to the media streams associated with a telephone call. They are able to read and write data from these media streams. DTMF (touch-tone) and non-DTMF tone detection and generations is also provided in the java.telephony.media package.

Phone Package

The javax.telephony.phone package permits applications to control the physical features of telephone hardware phone sets. Implementations may describe Terminals as collections of components, where each of these component-types has interfaces in this package.

Capabilities Package

The javax.telephony.capabilities package allows applications to query whether certain actions may be performed. Capabilities take two forms: static capabilities indicate whether an implementation supports a feature; dynamic capabilities indicate whether a certain action is allowable given the current state of the call model.

Private Data Package

The javax.telephony.privatedata package enables applications to communicate data directly with the underlying hardware switch. This data may be used to instruct the switch to perform a switch-specific action. Applications may also use the package to "piggy-back" a piece of data with a Java Telephony API object.

The Java Telephony Call Model

The JTAPI call model consists of a half-dozen Java objects. These objects are defined using Java interfaces in the core package. Each call model object represents either a physical or logical entity in the telephone world. The primary purpose of these call model objects is to describe telephone calls and the endpoints involved in a telephone call. These call model objects are related to one another in specific ways, which is summarized below and described in more detail in the core package specification.

Figure 10:
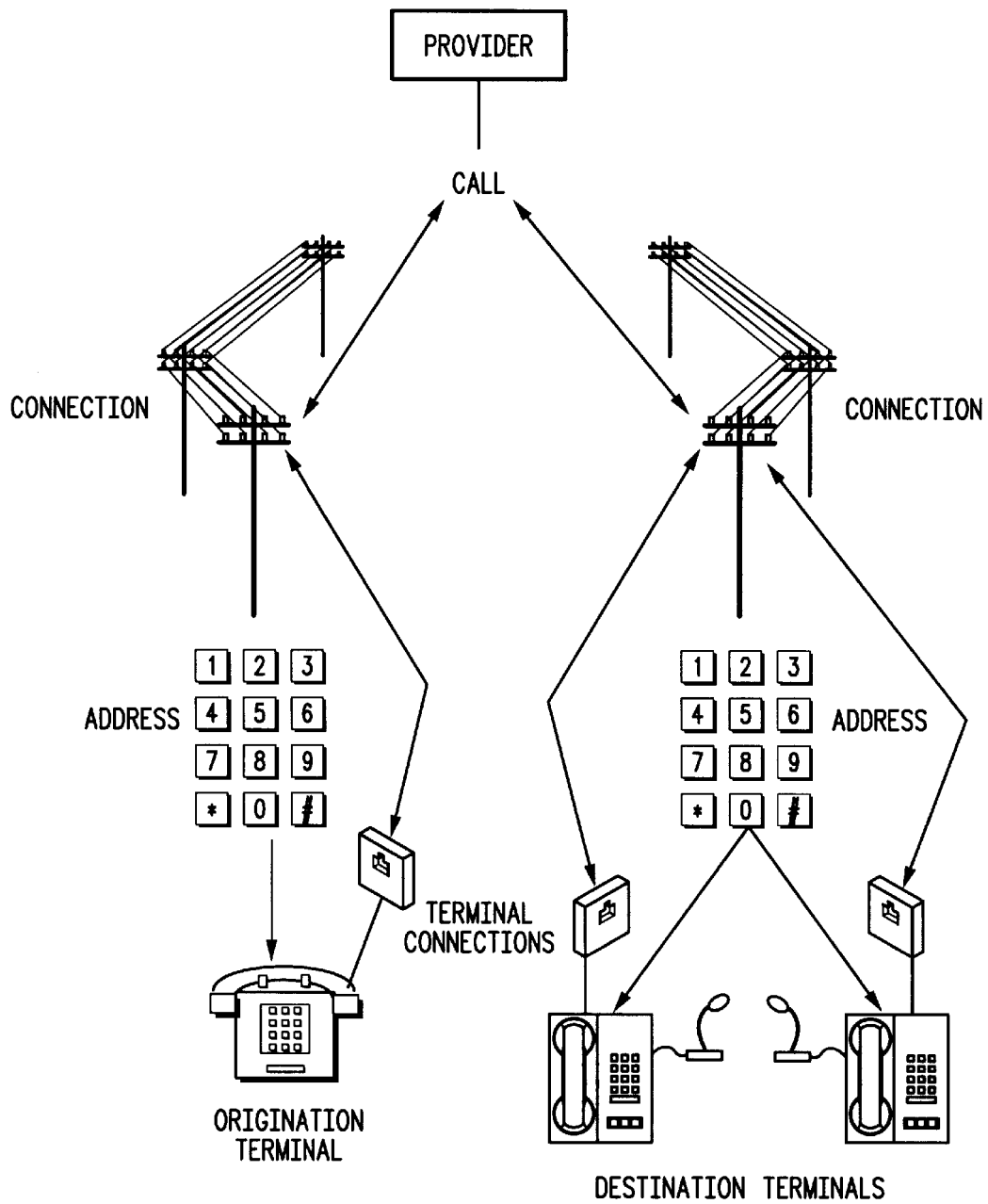

The FIG. 10 shows the JTAPI call model and the objects that compose the call model. A description of each object follow the diagram.

Provider Object

The Provider object is an abstraction of telephony service-provider software. The provider might manage a PBX connected to a server, a telephony/fax card in a desktop machine, or a computer networking technology, such as IP. A Provider hides the service-specific aspects of the telephony subsystem and enables Java applications and applets to interact with the telephony subsystem in a device-independent manner.

Call Object

The Call object represents a telephone call, the information flowing between the service provider and the call participants. A telephone call comprises a Call object and zero or more connections. In a two-party call scenario, a telephone call has one Call object and two connections. A conference call is three or more connections associated with one Call object.

Address Object

The Address object represents a telephone number. It is an abstraction for the logical endpoint of a telephone call. Note that this is quite distinct from a physical endpoint. In fact, one address may correspond to several physical endpoints (i.e. Terminals)

Connection Object

A Connection object models the communication link between a Call object and an Address object. This relationship is also referred to as a "logical" view, because it is concerned with the relationship between the Call and the Address (i.e. a logical endpoint). Connection objects may be in one of several states, indicating the current state of the relationship between the Call and the Address. These Connection states are summarized later.

Terminal Object

The Terminal object represents a physical device such as a telephone and its associated properties. Each Terminal object may have one or more Address Objects (telephone numbers) associated with it, as in the case of some office phones capable of managing multiple call appearances. The Terminal is also known as the physical" endpoint of a call, because it corresponds to a physical piece of hardware.

TerminalConnection Object

TerminalConnection objects model the relationship between a Connection and the physical endpoint of a Call, which is represented by the Terminal object. This relationship is also known as the "physical" view of the Connection (in contrast to the Connection, which models the logical view). The TerminalConnection describes the current state of relationship between the Connection and a particular Terminal. The states associated with the TerminalConnection are described later in this document.

Core Package Methods

The core package defines three methods to support its primary features: placing a telephone call, answering a telephone call, and disconnecting a connection to a telephone call. These methods are Call.connect( ), TerminalConnection.answer( ), and Connection.disconnect( ), respectively.

Call.connect( )

Once an application has an idle call object (obtained via Provider.createCall( )), it may place a telephone call using the Call.connect( ) method. The application must specify the originating Terminal (physical endpoint) and the originating Address (logical endpoint) on that Terminal (in the case that a Terminal has multiple telephone numbers on it). It also provides the destination telephone number string. Two Connection objects are returned from the Call.connect( ) method, representing the originating and destination ends of the telephone call.

TerminalConnection.answer( )

Applications monitor with observers (discussed later) on Terminal for when incoming calls are presented. An incoming telephone call to a Terminal is indicated by a Terminal-Connection to that Terminal in the RINGING state (see terminalConnection states below). At that time, applications may invoke the TerminalConnection.answer( ) to answer that incoming telephone call.

Connection.disconnect( )

The Connection.disconnect( ) method is used to remove an Address from the telephone call. The Connection object represents the relationship of that Address to the telephone call. Applications typically invoke this method when the Connection is in the CONNECTED state, resulting in the Connection moving to the DISCONNECTED state. In the core package, application may only remove entire Addresses from the Call, and all of the Terminals associated with that Address which are part of the call are removed as well. The call control extension package provides the ability for application to remove individual Terminals only from the Call.

Connection Object States

Figure 11:
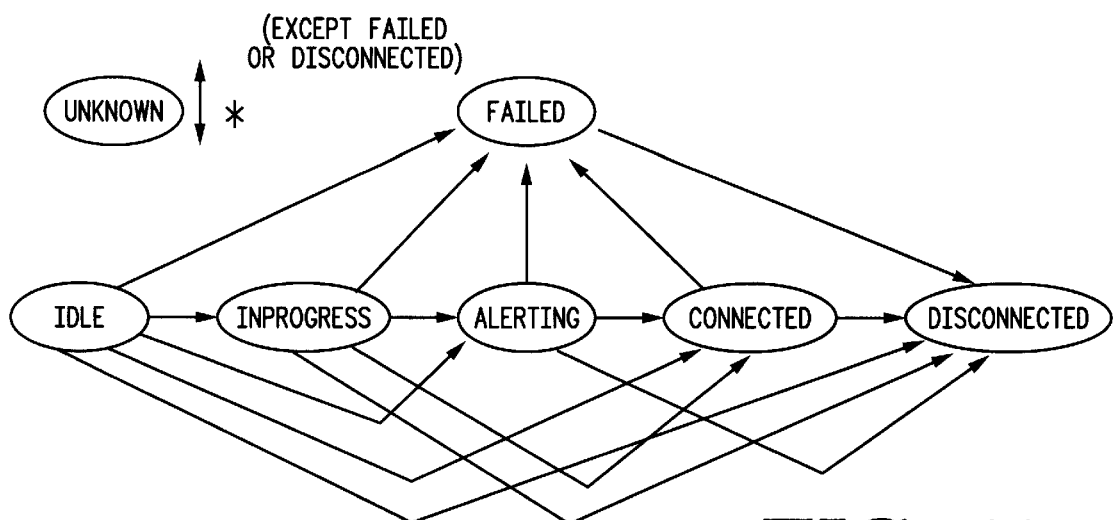

A Connection object is always in a state that reflects the relationship between a Call and an Address. The state in which a Connection exists is not only important to the application for information purposes, it is always an indication of which methods and actions can be invoked on the Connection object. The state changes which Connection objects undergo are governed by rules shown below in a state transition diagram. This diagram guarantees to application developers the possible states in which the Connection object can transition given some current state. These state transition rules are invaluable to application developers. FIG. 11 shows the possible state transitions for the Connection object. There follows a brief summary of the meaning of each state.

IDLE State

The IDLE state is the initial state for all new Connection objects. Connections typically transition quickly out of the IDLE state into another state. A Connection in the IDLE state indicates that the party has just joined the telephone call in some form. No Core methods are valid on Connections in the IDLE state.

INPROGRESS State

The INPROGRESS state indicates that a telephone call is currently being placed to this destination endpoint.

ALERTING State

The ALERTING state indicates that the destination party of a telephone call is being alerted to an incoming telephone call.

CONNECTED State

The CONNECTED state indicates that a party is actively part of a telephone call. A Connection in the CONNECTED state implies that the associated party is talking to the other parties on the call or is connected to tone.

DISCONNECTED State

The DISCONNECTED state indicates that a party is no longer a part of a telephone call. No methods are valid for Connections in the DISCONNECTED state.

FAILED state

The FAILED state indicates that a telephone call placed to the endpoint has failed. For example, if an application uses Call.connect( ) to place a telephone call to a party who is busy, the Connection associated with the called party transitions into the FAILED state.

UNKNOWN State

The UNKNOWN state indicates that the Provider cannot determine the state of the Connection at the present time. A Connection may transition in and out of the UNKNOWN state at any time, unless it is in either the DISCONNECTED or FAILED state. The effects of the invocation of any method on a Connection in this state are unpredictable.

TerminalConnection Object States

Figure 12:
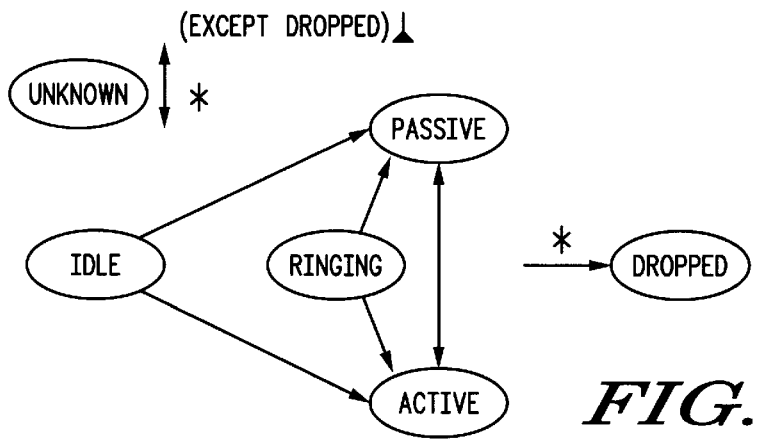

The TerminalConnection object represents the relationship between a Terminal and a Connection. As mentioned previously, these objects represent a physical view of the Call, describing which physical Terminal endpoints are part of the telephone call. Similar to Connection objects, TerminalConnection objects have their own set of states and state transition diagram. A state transition diagram, is shown in FIG. 12 and a brief description of each state follows.

IDLE State

The IDLE state is the initial state for all TerminalConnection objects. It has the same connotation for the Connection object's IDLE state.

ACTIVE State

The ACTIVE state indicates a Terminal is actively part of a telephone call. This often implies that the Terminal handset is off-hook.

RINGING State

The RINGING state indicates that a Terminal is signaling to a user that an incoming telephone call is present at the Terminal.

DROPPED State

The DROPPED state indicates that a Terminal was once part of a telephone call, but has since dropped off of that telephone call. The DROPPED state is the final state for all TerminalConnections.

PASSIVE State

The PASSIVE state indicates a Terminal is part of a telephone call, but not actively so. A TerminalConnection in the PASSIVE state indicates that a resource on the Terminal is being used by this telephone call. Packages providing advanced features permit Terminals to join calls from the PASSIVE state.

UNKNOWN State

The UNKNOWN state indicates that the Provider is unable to determine the current state of a TerminalConnection. It has a similar connotation to that of the Connection object's UNKNOWN state.

Placing a Telephone Call

The past several sections have outlines the JTAPI call model, the essential methods in the core package, and the Connection and TerminalConnection states. This section ties all of this information together, presenting a common scenario found in most telephony applications. This section describes the state changes the entire call model typically undergoes when an application places a simple telephone call. Readers will come away with a coherent understanding of the call model changes for this simple example.

Figure 13:
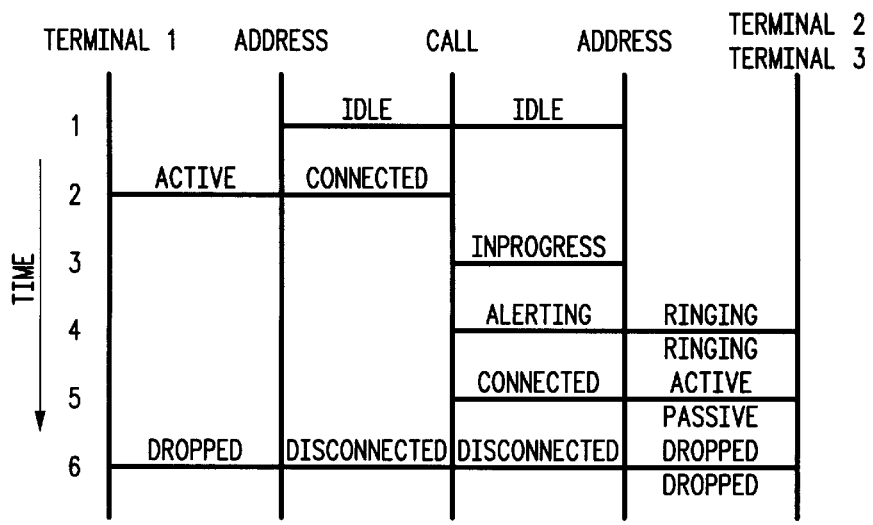

The vehicle used to describe the state changes undergone by the call model is shown in FIG. 13. This diagram is a call model timing diagram, where changes in the various objects are depicted as times increases down the vertical axis. This diagran shows the typical state changes after an application invokes the Call.connect( ) method.

In FIG. 13, discrete time steps are denoted by integers down the vertical axis. Time increases down this axis, but the integers are not meant to indicate real (clock) time.

FIG. 13, as a whole, represents a single telephone Call. In this case, the diagram represents a two-party telephone call (The Call.connect( ) method always results in a two-party call). The diagram may be broken into two parts: the left half and the right half. The left half represents the originating-end of the telephone call and the right half represents the destination-end of the telephone call.

On the left-hand (originating) side of the diagram, the two vertical lines represent the originating Terminal and Address (which are arguments to the Call.connect( ) method) objects, as indicated on the diagram. The horizontal lines represent either Connection objects or TerminalConnection objects as marked. Note that the Connection objects are drawn in the inner-most regions, whereas the TerminalConnection objects are drawn in the outer-most regions.

Similarly, on the right-hand (destination) side of the diagram, the two vertical lines represent the destination Address and Terminals. In this example, there are two destination Terminals associated with the destination Address. This configuration has been depicted previously in FIG. 10. Note that since there are two Terminals, there are two TerminalConnection objects on the destination side.

FIG. 13 can be read as follows: as time passes the Connection and TerminalConnection objects change states. The appearance of a new Connection or TerminalConnection horizontal line corresponds to a new object of that type being created.

In the example of placing a telephone call, we see that after the two Connections are created in the IDLE state, the originating Connection transitions to the CONNECTED state, while the destination Connection transitions to the INPROGRESS state. At that time, a TerminalConnection to the originating Terminal is created and transitions to the ACTIVE state. When the destination Connection transitions to the ALERTING state, two TerminalConnections are created in the RINGING state.

At this point, a person at one of the destination Terminals answers the call. When this happens, that TerminalConnection moves to the ACTIVE state, and the other Terminal-Connection moves to the PASSIVE state. At the same time, the destination Connection concurrently moves to the CON- NECTED state. When the telephone call ends, all Connections move to the DISCONNECTED state, and all TerminalConnections move to the DROPPED state.

As a final point, this document has used the terms "logical" and "physical" view of a telephone call. This diagram makes these concepts clear. An application can monitor the state changes of the Connection object (i.e. the logical view). By looking at the diagram, the reader can understand that these states provide a higher-level view of the progress of the telephone call. The TerminalConnection state changes represent the physical view. By monitoring the TerminalConnection state changes, applications can find out what is happening at each physical endpoint.

The lava Telephony Observer Model

The Java Telephony API uses the Java observer/observable model to asynchronously notify the application of various changes in the JTAPI call model. These changes may include the state change of an object or the creation of an object.

The Provider, Call, Terminal, and Address objects have Observers. The interfaces corresponding to these observers are ProviderObserver, CallObserver, TerminalObserver, and AddressObserver, respectively.

The ProviderObserver reports all state changes to the Provider object. For the core package, state changes are reported when the Provider changes state from OUT_OF_SERVCE, to IN_SERVICE, to SHUTDOWN.

The Call observer reports state change information for all Connections and TerminalConnections that are part of the telephonecall as well as state changes to the Call itself. These state changes are reported on neither the Address nor the Terminal observers.

At times, the application may want to monitor Address or Terminal objects for incoming telephone calls. In these instances, the application uses the Address.addCallObserver( ) or the Terminal.addCallObserver( ) methods. These methods instruct the implementation to automatically add a CallObserver to any calls that come to an Address or Terminal. These CaLLObservers are removed once the call leaves the Address or Terminal.

The Address and Terminal observers report any state changes in these objects. In the core package there are no events for these objects. The AddressObserver and TerminalObserver interfaces still exist, however, so other packages may extend these interfaces.

Locating and Obtaining Providers

The Java Telephony API defines a convention by which telephony server implementations of JTAPI make their services available to applications.

The two elements that link an application to a server are:
JtapiPeerFactory

The JtapiPeerFactory class is the first point of contact for an application that needs telephony services. It has the ability to return a named JtapiPeer object or a default JtapiPeer object. It is defined as a static class.
JtapiPeer The JtapiPeer interface is the basis for a vendor's particular implementation of the Java Telephony API. Each vendor that provides an implementation of JTAPI must implement this interface in a class that can be loaded by the JtapiPeerFactory.

It is through a class that implements the JtapiPeer object that an application gets a Provider object.
JtapiPeerFactory: Getting Started The JtapiPeerFactory is a static class defined in JTAPI. Its sole public method, getjtapiPeer( ) gets the JtapiPeer implementation requested or it returns a default implementation. getjtapiPeer( ) takes the name of the desired JTAPI server implementation class as a parameter to return an object instance of that class. If no name is provided, getjtapiPeer( ) returns the default JTAPI server implementation object.
JtapiPeer: Getting a Provider Object JtapiPeer is an interface. It is used by the JTAPI server implementors. It defines the methods that applications use to get Provider objects, to query services available on those providers, and to get the name of the JtapiPeer object instance. By creating a class that implements the JtapiPeer interface, JTAPI implementations make the following methods available to applications.

Applications use the JtapiPeer.getProvider( ) method to obtain new Provider objects. Each implementation may support one or more different "services" (e.g. for different types of underlying network substrate). A list of available services can be obtained via the ItapiPeer.getServices( ) method.

Applications may also supply optional arguments to the Provider. These arguments are appended to the string argument passed to the JtapiPeer.getProvider( ) method. The string argument has the following format:

<service name>; arg1=val1; arg2=val2; . . .

Where <service name> is not optional, and each optional argument pair which follows is separated by a semi-colon. The keys for these arguments are implementation specific, except for two standard-defined keys:

1.login: provides the login user name to the Provider.
2.passwd: provides a password to the Provider.

Applications use the JtapiPeer.getName( ) method to get the name of this JtapiPeer object instance. It has a name parameter, which is the same name used as an argument to the JtapiPeerFactory.getjtapiPeer( ) method.

Security in the lava Telephony API

JTAPI peer implementations use the Java "sandbox" model for controlling access to sensitive operations. Callers of JTAPI methods are categorized as "trusted" or "untrusted", using criteria determined by the runtime system. Trusted callers are allowed full access to JTAPI functionality. Untrusted callers are limited to operations that cannot compromise the system's integrity.

JTAPI may be used to access telephony servers or implementations that provide their own security mechanisms. These mechanisms remain in place; parameters such as user name and password are provided through parameters on thejtapiPeer.getProvider( ) method.

I claim:

1. A radio communications device comprising:
  a memory having stored therein a user application program and a telephony program which, in operation, has a plurality of terminal objects;
  a software application programming interface (API) between the user application program and the telephony program, wherein the API has a command for accepting an argument for establishing a single mode call and wherein the telephony program accepts, as an argument of the command for establishing the single mode call, an array identifying a plurality of terminal objects, and permitting overriding of the single mode call to enable establishment of a dual mode call for the plurality of terminal objects using the same command as used in establishing the single mode call.

2. The device of claim 1, wherein the plurality of terminal objects are selectable to be at least two different terminal objects from the group comprising voice terminal objects, fax terminal objects and data terminal objects.

3. The device of claim 1, having at least voice elements controlled by a first terminal object of the plurality of terminal objects and data elements controlled by a second terminal object of the plurality of terminal objects.

4. The device of claim 3, comprising a first processor having a virtual machine on which at least the telephony program runs and a second processor having transceiver software running thereon that controls the voice elements and the data elements.

5. The device of claim 4, comprising a serial link between the first processor and the second processor.

6. The device of claim 4, comprising a link between the first processor and the second processor, wherein the link identifies to the transceiver software that a command for establishing a call is one of a principal type and an alternate type, wherein an alternate type indicates a dual mode call.

7. A method of establishing a dual mode call in a radio communications device, comprising:

invoking, from an application program through an application programming interface (API), a call connection class adapted to establish a single mode call and providing means for overriding the single mode call establishment by using a command having an argument that comprises an array, where the array comprises a plurality of terminal objects of different types selected from a voice type, a fax type and a data type, thereby enabling the establishment of a dual mode call using the single mode call connection class.

8. The method of claim 7, further comprising, in the call connection class, invoking a first connection object that references a voice terminal and a second connection object that references one of a data terminal and a fax terminal.

9. The method of claim 7, wherein the application program is further capable of interfacing with a call connection class that does not support establishment of a dual mode calling by using a command having an argument that comprises a single terminal object.

10. The method of claim 7, wherein the call connection class is capable of being invoked by a command having an argument that comprises a single terminal object, thereby establishing a single-mode call.

11. A radio communications device comprising:

a memory having stored therein a user application program and a telephony program, the telephony program having a set of defined events, each defined event having an event identifier (ID), the set of defined events being grouped into (a) a base class, (b) a provider event class, (c) an address and call control address events class, (d) a call and call control call events class, (e) a connection and call control connection events class, (f) a terminal and call control terminal events class, (g) a terminal connection and call control terminal connection events class, and (h) a media events class; and an application programming interface (API) between the user application program and the telephony program, wherein the API accepts a command from the application program, the command defining an event class for establishing a single mode call from one of the groups (a) through (h) together with an ID defining an event within the event class, the ID for overriding the establishing of the single mode call and establishing a dual mode call using the same event class.

12. The radio communications device according to claim 11, wherein each defined event has a computer program defining a method, and wherein all computer programs for methods corresponding to events of a set of defined events are included within a class object, without being subdefined in objects at any level lower than the class object.

* * * * *